US 11,404,864 B2

(12) United States Patent
Woo et al.

(10) Patent No.: US 11,404,864 B2
(45) Date of Patent: Aug. 2, 2022

(54) WIRELESS POWER RECEIVING DEVICE AND CONTROL METHOD THEREOF

(71) Applicant: Samsung Electronics Co., Ltd., Suwon-si (KR)

(72) Inventors: Taehyun Woo, Suwon-si (KR); Youngjoon Park, Suwon-si (KR); Jungsu Park, Suwon-si (KR); Woojin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 16/829,943

(22) Filed: Mar. 25, 2020

(65) Prior Publication Data

US 2020/0313424 A1  Oct. 1, 2020

(30) Foreign Application Priority Data

Mar. 26, 2019  (KR) .................. 10-2019-0034670

(51) Int. Cl.
*H02H 9/00* (2006.01)
*H02J 7/00* (2006.01)
(Continued)

(52) U.S. Cl.
CPC ......... *H02H 9/002* (2013.01); *H02J 7/00304* (2020.01); *H02J 50/12* (2016.02); *H02J 50/80* (2016.02)

(58) Field of Classification Search
CPC ...... H02H 9/002; H02J 7/00304; H02J 50/12; H02J 50/80; H02J 7/00034; H02J 7/00712; H02J 50/005; H02J 50/10
See application file for complete search history.

(56) References Cited

U.S. PATENT DOCUMENTS 10,840,748 B2 *  11/2020  Bhargava ................ H02J 5/005
2012/0155136 A1     6/2012  Von Novak et al.
(Continued)

FOREIGN PATENT DOCUMENTS

JP      2005245064 A  *  9/2005
JP      2017-147681 A     8/2017
(Continued)

OTHER PUBLICATIONS

International Search Report dated May 12, 2020 in connection with International Patent Application No. PCT/KR2020/001631, 3 pages.
(Continued)

*Primary Examiner* — Nghia M Doan

(57) ABSTRACT

An electronic device acting as a power receiving device and a control method. The electronic device includes a battery, a coil, a reception circuit electrically connected to the coil, a charger a current sensing circuit, and at least one control circuit. The charger supplies a specified voltage to a system and controls the state of charge of the battery by using the voltage supplied from the reception circuit. The current sensing circuit is configured to sense an inrush current caused by the system. The at least one control circuit is configured to transmit a first control signal for requesting to increase a transmission voltage supplied from an external electronic device when an inrush current is detected through the current sensing circuit.

14 Claims, 13 Drawing Sheets

(51) Int. Cl.
*H02J 50/80* (2016.01)
*H02J 50/12* (2016.01)

(56) References Cited

U.S. PATENT DOCUMENTS

| | | | |
|---|---|---|---|
| 2013/0057078 A1* | 3/2013 | Lee | H02J 50/12 |
| | | | 307/104 |
| 2015/0318730 A1 | 11/2015 | Bhargava et al. | |
| 2017/0155272 A1 | 6/2017 | Kim et al. | |
| 2017/0222469 A1* | 8/2017 | Tustin | H02J 50/80 |
| 2017/0373522 A1 | 12/2017 | Pelosi et al. | |
| 2019/0058357 A1 | 2/2019 | Du et al. | |

FOREIGN PATENT DOCUMENTS

| | | | |
|---|---|---|---|
| JP | 2019083685 A | * | 5/2019 |
| WO | 2012082784 A2 | | 6/2012 |

OTHER PUBLICATIONS

Written Opinion of the International Searching Authority dated May 12, 2020 in connection with International Patent Application No. PCT/KR2020/001631, 5 pages.

* cited by examiner

WIRELESS POWER RECEIVING DEVICE AND CONTROL METHOD THEREOF

CROSS-REFERENCE TO RELATED APPLICATION

This application is based on and claims priority under 35 U.S.C. 119 to Korean Patent Application No. 10-2019-0034670 filed on Mar. 26, 2019 in the Korean Intellectual Property Office, the disclosure of which is herein incorporated by reference in its entirety.

BACKGROUND

1. Field

Various embodiments of the disclosure relate to a wireless power receiving device and a control method thereof.

2. Description of Related Art

Recently, wireless or contactless charging techniques have been developed and are being applied to various electronic devices.

Wireless charging technology enables charging of the battery of an electronic device without connecting the electronic device to a wired charger. For example, wireless charging technology allows a user to charge the battery by simply placing their smartphone or wearable device on a charging pad or charging cradle.

Meanwhile, during wireless charging, when the consumption of the electric current used by a power receiving device severely fluctuates, wireless charging may be disrupted. When the power consumption used by the power receiving device severely fluctuates (e.g., the power receiving device transitions from the sleep state to the wake-up state, or the voltage changes), wireless charging can be interrupted.

SUMMARY

The disclosure has been made in view of the above problem. Accordingly, various embodiments of the disclosure provide a wireless power receiving device and a control method thereof that can prevent disruption of wireless charging by dynamically adjusting the charging voltage supplied to the charger based on detecting a sudden change in current consumption or a sudden change in voltage and can reduce heat generation of the wireless charging system.

According to various embodiments of the disclosure, there is provided an electronic device. The electronic device may include: a battery; a coil; a reception circuit electrically connected to the coil; a charger that supplies a specified voltage to a system and controls the state of charge of the battery by using the voltage supplied from the reception circuit; a current sensing circuit configured to sense an inrush current caused by the system; and at least one control circuit configured to transmit a first control signal for requesting to increase a transmission voltage supplied from an external electronic device when an inrush current is detected through the current sensing circuit.

According to various embodiments of the disclosure, there is provided a method for operating an electronic device. The operation method may include: supplying, by a reception circuit, a voltage to a charger based on the power received from an external electronic device through a coil; supplying, by the charger, a specified voltage to a system based on the voltage supplied from the reception circuit, and controlling the state of charge of a battery; detecting an inrush current caused by the system via a current sensing circuit; and transmitting, upon detecting an inrush current, a first control signal for requesting to increase a transmission voltage supplied from the external electronic device.

According to various embodiments of the disclosure, the wireless power receiving device and the control method thereof can prevent disruption of wireless charging by dynamically adjusting the charging voltage supplied to the charger IC based on detection of a sudden change in current consumption or a sudden change in voltage and can reduce heat generation of the wireless charging system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
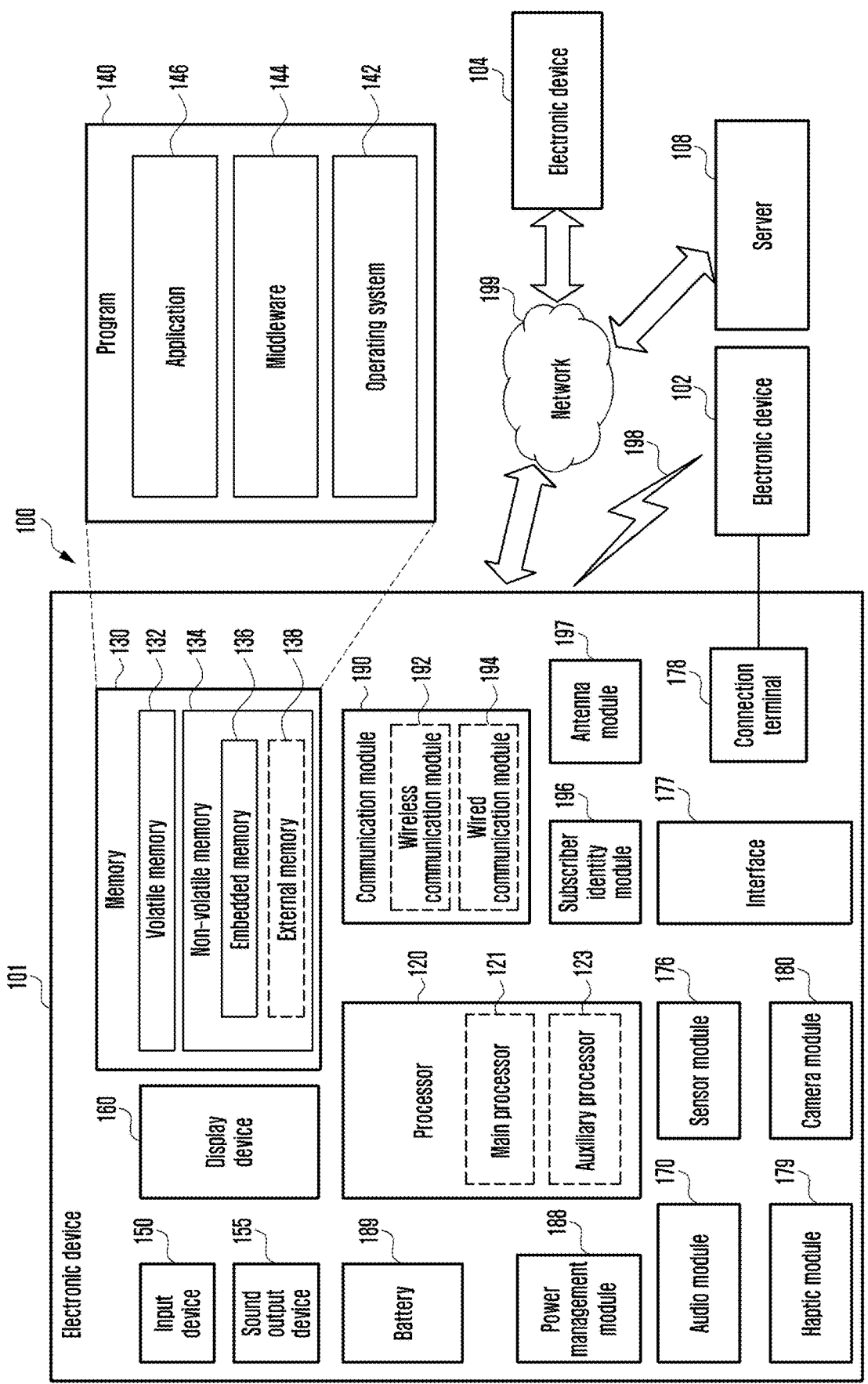
FIG. 1 illustrates a block diagram of an electronic device in a network environment according to various embodiments.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
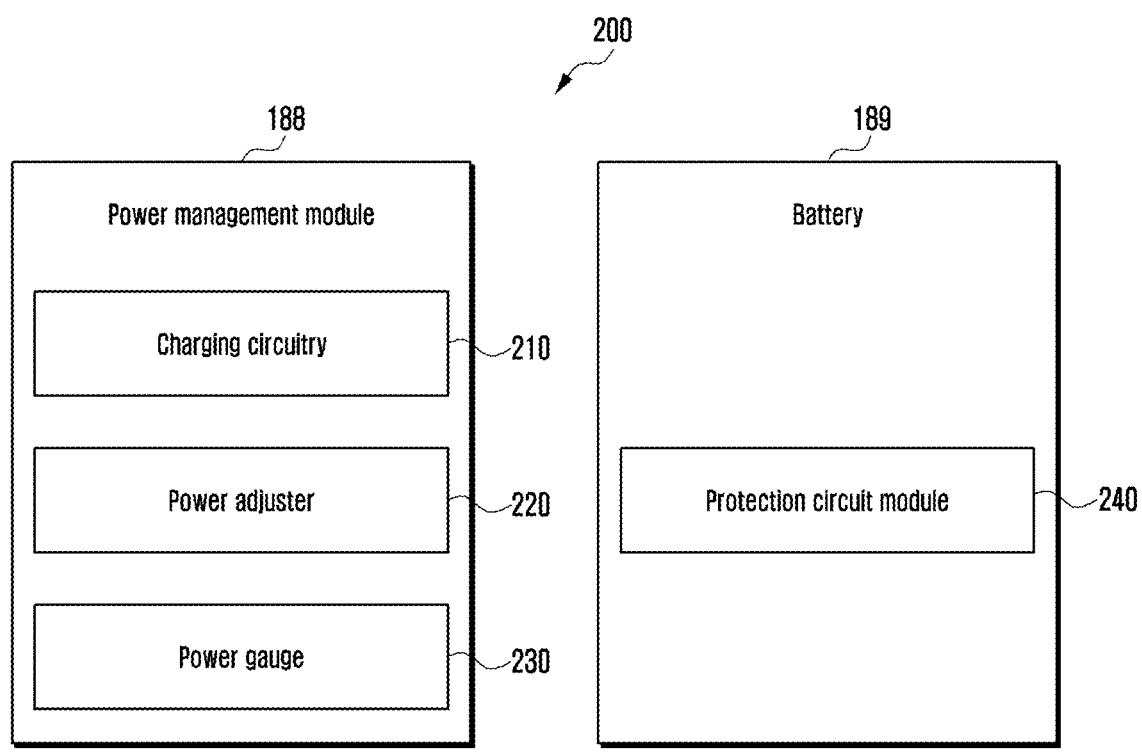
FIG. 2 illustrates a block diagram of a power management module and a battery according to various embodiments.

FIG. 2 illustrates a block diagram 200 of the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120). According to an embodiment, the charging circuitry 210 may include a wireless charging circuit or a wired charging circuit. For example, the wireless charging circuit can support a wireless charging system 300 shown in FIG. 3.

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
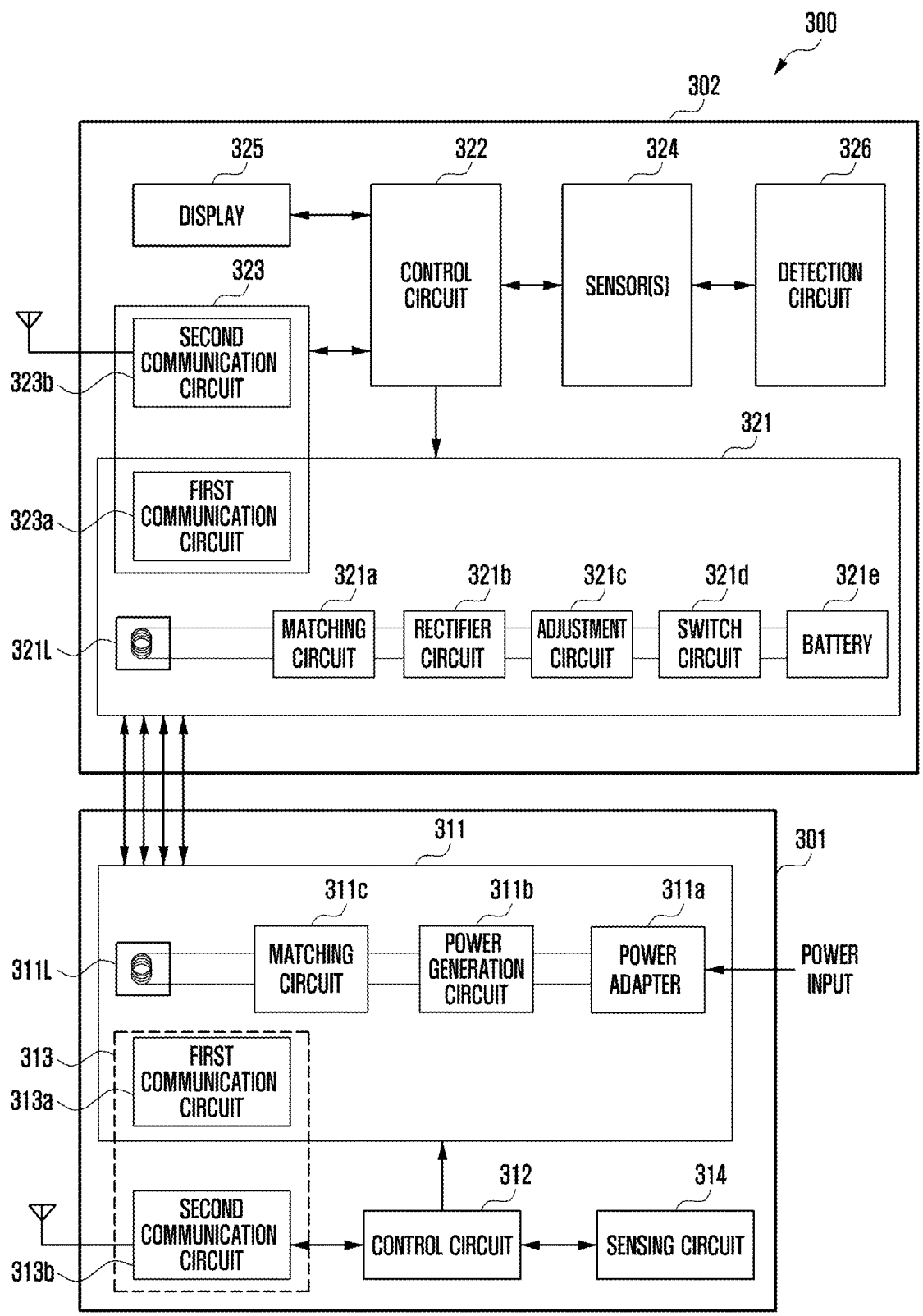
FIG. 3 illustrates a wireless charging system according to various embodiments.

FIG. 3 illustrates a wireless charging system 300 according to various embodiments. With reference to FIG. 3, in various embodiments, the electronic device 302 may receive power wirelessly, and the external electronic device 301 (e.g., electronic device 101 in FIG. 1) (hereinafter, also referred to as a "power transmitting device") may wirelessly supply power to the electronic device 302 (e.g., electronic device 102 in FIG. 1) (hereinafter, also referred to as a "power receiving device"). The external electronic device 301 may be an electronic device operating in power transmission mode. The electronic device 302 may be a device that is the same as or similar to the external electronic device 301, and may operate in, for example, power reception mode.

In various embodiments, the power transmitting device 301 may include a power transmission circuit 311, a control circuit 312, a communication circuit 313, and a sensing circuit 314.

In various embodiments, the power transmission circuit 311 may include a power adapter 311a for receiving power from the outside and appropriately changing the voltage of the input power, a power generation circuit 311b for generating power, and a matching circuit 311c for maximizing the efficiency between the transmission coil 311L and the reception coil 321L.

In various embodiments, to enable power transmission to a plurality of power receiving devices (e.g., first external electronic device, and second external electronic device), the power transmission circuit 311 may include at least one of plural power adapters 311a, plural power generation circuits 311b, plural transmission coils 311L, or plural matching circuits 311c.

In various embodiments, the control circuit 312 may control the overall operation of the power transmitting device 301 and may generate various messages necessary for wireless power transmission and transmit them to the communication circuit 313. In one embodiment, the control circuit 312 may calculate the power (or amount of power) to be sent to the power receiving device 302 based on the information received from the communication circuit 313. In one embodiment, the control circuit 312 may control the power transmission circuit 311 so that generated power can be transmitted through the transmission coil 311L to the power receiving device 302.

In various embodiments, the communication circuit 313 may include at least one of a first communication circuit 313a or a second communication circuit 313b. The first communication circuit 313a may communicate with a first communication circuit 323a of the power receiving device 302 by using a frequency equal to or close to the frequency used by the transmission coil 311L for power transmission.

The first communication circuit 313a may communicate with the first communication circuit 323a by using the transmission coil 311L. Data (or communication signal) generated by the first communication circuit 313a may be transmitted through the transmission coil 311L. The first communication circuit 313a can transmit data to the power receiving device 302 through frequency shift keying (FSK) modulation. In various embodiments, the first communication circuit 313a may communicate with the first communication circuit 323a of the power receiving device 302 by varying the frequency of the power signal transmitted through the transmission coil 311L. Alternatively, the first communication circuit 313a may communicate with the first communication circuit 323a of the power receiving device 302 by including data in the power signal generated by the power generation circuit 311b. For example, the first communication circuit 313a may represent data by increasing or decreasing the frequency of the power transmission signal.

The second communication circuit 313b may communicate with a second communication circuit 323b of the power receiving device 302 by using a frequency different from the frequency used by the transmission coil 311L for power transmission (e.g., outband scheme). For example, the second communication circuit 313b can obtain information about the state of charge (e.g. voltage after rectification, rectified voltage (e.g. Vrec), information, current flowing in the coil or rectifier circuit (e.g. Iout), various packets, and messages) from the second communication circuit 323b by using one of various short range communication schemes such as Bluetooth, Bluetooth low energy (BLE), Wi-Fi, and near field communication (NFC).

In various embodiments, the sensing circuit 314 may include at least one sensor, and may sense one or more states of the power transmitting device 302 by using the at least one sensor.

In various embodiments, the sensing circuit 314 may include at least one of a temperature sensor, a motion sensor, or a current (or voltage) sensor. The sensing circuit 314 may sense the temperature state of the power transmitting device 301 using the temperature sensor, may sense the movement state of the power transmitting device 301 using the motion sensor, and may sense the state of the output signal of the power transmitting device 301 (e.g., current magnitude, voltage magnitude, or power magnitude) using the current (or voltage) sensor.

In one embodiment, the current (or voltage) sensor may measure a signal in the power transmission circuit 311. The current (or voltage) sensor may measure a signal at a portion of the matching circuit 311c or the power generation circuit 311b. For example, the current (or voltage) sensor may include a circuit for measuring a signal at the front end of the coil 311L.

In various embodiments, the sensing circuit 314 may be a circuit for foreign object detection (FOD).

In various embodiments, the power receiving device 302 (e.g., electronic device 101 in FIG. 1) may receive a power reception circuit 321 (e.g., power management module 188 in FIG. 1), a control circuit 322 (e.g., processor 120 in FIG. 1), a communication circuit 323 (e.g., communication module 190 in FIG. 1), at least one sensor 324 (e.g., sensor module 176 in FIG. 1), a display 325 (e.g., display device 160 in FIG. 1), and a detection circuit 326. A description on components of the power receiving device 302 corresponding to those of the power transmitting device 301 may be omitted.

In various embodiments, the power reception circuit 321 may include, for wirelessly receiving power from the power transmitting device 301, a reception coil 321L, a matching circuit 321a, a rectifier circuit 321b for rectifying the received AC power to DC power, an adjustment circuit 321c for adjusting the charging voltage, a switch circuit 321d, and a battery 321e (e.g., battery 189).

In various embodiments, the control circuit 322 may control the overall operation of the power receiving device 302, and generate various messages necessary for wireless power transmission and forward them to the communication circuit 323.

In various embodiments, the communication circuit 323 may include at least one of a first communication circuit 323a or a second communication circuit 323b. The first communication circuit 323a may communicate with the power transmitting device 301 through the reception coil 321L.

The first communication circuit 323a may communicate with the first communication circuit 313a through the reception coil 321L. Data (or communication signal) generated by the first communication circuit 323a may be transmitted via the reception coil 321L. The first communication circuit 323a may transmit data to the power transmitting device 301 by using amplitude shift keying (ASK) modulation. The second communication circuit 323b may communicate with the power transmitting device 301 by using one of various short-range communication schemes such as Bluetooth, BLE, Wi-Fi, and NFC.

In various embodiments, the at least one sensor 324 may include one or more of a current/voltage sensor, a temperature sensor, an illuminance sensor, and an acceleration sensor.

In various embodiments, the display 325 may display various information required for wireless power transmission and reception.

In various embodiments, the detection circuit 326 may detect the power transmitting device 301 by sensing a discovery signal or power received from the power transmitting device 301. The detection circuit 326 may detect a signal change at the input or output terminal of the coil 321L, the matching circuit 321a, or the rectifier circuit 321b caused by the signal of the coil 321L generated by a signal output from the power transmitting device 301. The detection circuit 326 may be included in the power reception circuit 321.

According to various embodiments of the disclosure, the electronic device (e.g., electronic device 500 in FIG. 5) may include: a battery (e.g., battery 503 in FIG. 5); a coil; a reception circuit (e.g., reception circuit 501 in FIG. 5) electrically connected to the coil; a charger (e.g., charger 502 in FIG. 5) that supplies a voltage to a system (e.g., system 504 in FIG. 5) and controls the state of charge of the battery 503 by using the voltage supplied from the reception circuit 501; a current sensing circuit (e.g., current sensing circuit 505 in FIG. 5) that senses an inrush current generated by the system 504; and at least one control circuit (e.g., control circuit 506 in FIG. 5) configured to transmit a first control signal for increasing the transmission voltage supplied from an external electronic device (e.g., power transmitting device 400 in FIG. 5) when an inrush current is detected through the current sensing circuit 505. If an inrush current is detected when the transmission voltage supplied from the external electronic device 400 is at a first voltage level, the control circuit 506 may be configured to transmit the first control signal for requesting to raise the transmission voltage to a second voltage level higher than the first voltage level. If no inrush current is detected when the transmission voltage supplied from the external electronic device 400 is at the second voltage level, the control circuit 506 may be configured to transmit the external electronic device 400 a second control signal for requesting to lower the transmission voltage to the first voltage level. The current sensing circuit 505 may be disposed between the reception circuit 501 and the charger 502 or between the charger 502 and the system 504. The current sensing circuit 505 may include an inductor disposed between the reception circuit 501 and the charger 502, and a comparator for comparing voltages at both ends of the inductor and outputting the comparison result. The reception circuit 501 may include a rectifier circuit for rectifying power received through the coil, and an adjustment circuit for adjusting the charging voltage supplied to the charger 502. The system 504 may include an application processor or a communication processor. The inrush current may be a sudden current change or a sudden voltage change that occurs at least some of the input node or the output node of the charger 502 and is caused by a change in the hardware state of the system 504. The control circuit 506 may be included in the reception circuit 501 or the application processor of the system 504. The current sensing circuit 505 may sense an inrush current at least some of the input node or the output node of the charger 502 during a period when the application processor or the communication processor switches from sleep mode to normal mode.

Figure 4:
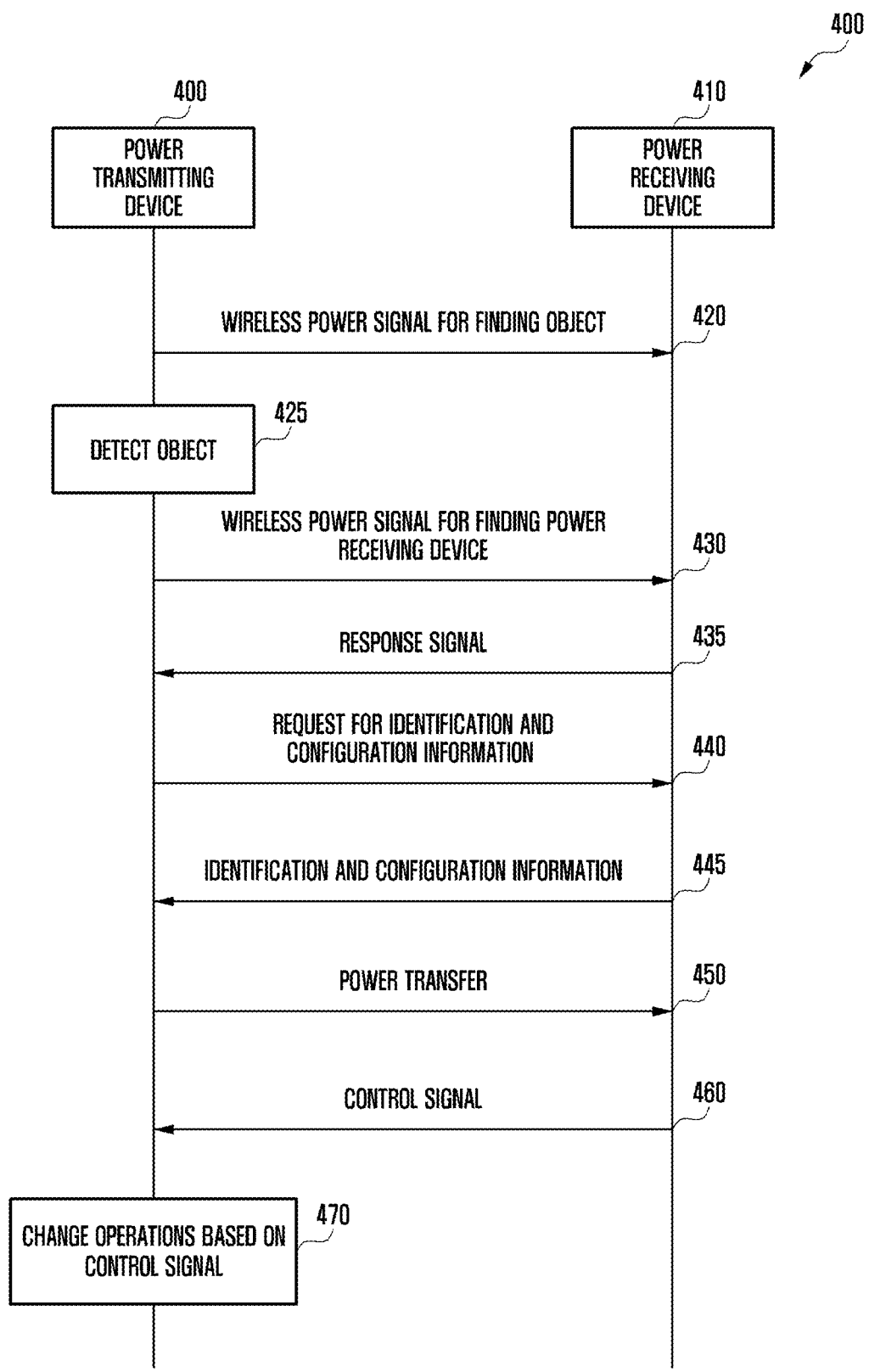
FIG. 4 illustrates operations between the power transmitting device and the power receiving device included in the wireless charging system.

FIG. 4 illustrates operations between the power transmitting device 400 (e.g., power transmitting device 301 in FIG. 3) and the power receiving device 410 (e.g., power receiving device 302 in FIG. 3) included in the wireless charging system (e.g., wireless charging system 300 in FIG. 3). One or more of operations 420 to 470 may be omitted or skipped. For example, when one way communication is used in the wireless charging system 300, operation 440 may be omitted. The power transmitting device 400 may include at least some of the components included in the power transmitting device 301 of FIG. 3 (e.g., power transmission circuit 311, control circuit 312, communication circuit 313, or sensing circuit 314). The power receiving device 410 may include at least some of the components included in the power receiving device 302 of FIG. 3 (e.g., reception coil 321L, matching circuit 321a, rectifier circuit 321b that rectifies the received AC power to DC power, adjustment circuit 321c for adjusting the charging voltage, switch circuit 321d, or battery 321e).

At operation 420, the power transmitting device 400 may determine whether an object (e.g., power receiving device 410, key, or coin) is present in the sensing area. When an object is present in the sensing area, the object may affect power transmission of the power transmitting device 400. For example, the sensing area may be the interface surface of the power transmitting device 400 in the case of inductive coupling, and may be the area within a range where power can be transferred in the case of resonance coupling. For example, the power transmitting device 400 may detect a change in the amount of power generated from the power transmission circuit (e.g., power transmission circuit 311 in FIG. 3) to determine whether an object is present within a preset range. In other words, the power transmitting device 400 may identify an object by detecting a change in one or more of the frequency, current, or voltage of the power transmission circuit 311. The power transmitting device 400 may distinguish the power receiving device 410 from objects that are not capable of receiving wireless power (e.g., key, or coin) among the objects within the sensing area.

The power transmitting device 400 may perform operation 430 upon detecting the power receiving device 410. If a given amount of time has elapsed or if the power receiving device 410 is not detected after a given number of searches, the power transmitting device 400 may not perform operation 430 until the object placed on the interface surface is removed.

In one embodiment, at operation 430, the power transmitting device 400 may transmit a wireless power signal to the power receiving device 410 to search for a power receiving device. For example, the wireless power signal may include power for activating the power receiving device 410 or at least one component of the power receiving device 410. The wireless power signal may be generated, for example, by applying the power signal of a selected operating point for a selected time. The operating point may be defined by the frequency, duty cycle, or amplitude of the voltage applied to the power transmission circuit 311.

At operation 435, the power receiving device 410 may transmit a response signal for the search signal at operation 430 to the power transmitting device 400. For example, the power receiving device 410 may transmit an indication of the strength of the received power signal or a power transmission termination signal to the power transmitting device 400 in response to the search signal. The strength of a power signal may indicate the degree of coupling or the degree of resonance coupling for power transmission between the power transmitting device 400 and the power receiving device 410. For example, when the power received by the power receiving device 410 is lower than the power transmitted by the power transmitting device 400, the power receiving device 410 may determine that the degree of coupling is low. For example, when there is no response to the power signal transmitted to the outside, the power transmitting device 400 may determine that a power receiving device 410 is not found. If the power transmitting device 400 fails to find a power receiving device 410 capable of receiving power, it may perform operation 420 again.

At operation 440, the power transmitting device 400 may transmit a request for identification information and/or configuration information related to wireless charging to the power receiving device 410. For example, the identification information may include version information, a manufacturing code, or a basic device identifier. The configuration information may include information regarding, for example, the wireless charging frequency, the maximum chargeable power, the amount of power required for charging, or the amount of average transmission power.

At operation 445, the power receiving device 410 may transmit the identification information and/or the configuration information to the power transmitting device 400. The power transmitting device 400 may generate a power transfer contract used for power charging with the power receiving device 410 at least partially based on the received identification information and/or configuration information.

For example, the power transfer contract may include a set of limits on the parameters that characterize the power transfer. These limits may include information regarding the version of the power transfer contract, identifier of the power receiving device 410 or the manufacturer, power class, expected maximum power, option settings, time for average received power, or scheme to determine the current of the primary cell of the power transmitting device 400.

In various embodiments, the request for identification information and/or configuration information related to wireless charging may be made in different directions, for example, in the opposite direction of the above description. For example, the power transmitting device 400 may transmit identification information of the power transmitting device 400 and/or configuration information related to wireless charging to the power receiving device 410, and then the power receiving device 410 may transmit a change request for the amount of charging power to the power transmitting device 400. In various embodiments, the power receiving device 410 may transmit a request for identification information and/or configuration information related to wireless charging to the power transmitting device 400, the power receiving device 410 may transmit a control command for the amount of charging power to the power transmitting device 400 based on the information obtained from the power transmitting device 400, and the power transmitting device 400 may adjust the amount of charging power based on the control command.

At operation 450, the power transmitting device 400 may transmit power to the power receiving device 410. For example, the power transmitting device 400 may transmit power to the power receiving device 410 based on the power transfer contract. Specifically, the power transmitting device 400 may monitor the parameters in the power transfer contract. If power transmission to the power receiving device 410 violates the limits specified in the power transfer contract, the power transmitting device 400 may terminate the power transmission and perform operation 420 again. The power transmitting device 400 may transmit, for example, a power signal having a resonant frequency of about 110 to 190 kHz to the power receiving device 410.

At operation 460, the power receiving device 410 may transmit a control signal to the power transmitting device 400 while receiving power from the power transmitting device 400. For example, when the battery is fully charged, the power receiving device 410 may transmit a control signal to the power transmitting device 400 to request to terminate wireless power transmission. The control signal may be at least one of, for example, a transmission power control signal (or, a power change signal), a control error signal, a received power signal, a charge status signal, or an end power transfer signal.

Here, the control error signal may be composed of a header indicating a control error, and a message including a control error value. For example, the power receiving device 410 may set the control error value to zero if the power received at operation 450 from the power transmitting device 400 is within a selected range. The power receiving device 410 may set the control error value to a negative value if the received power exceeds the selected range. The power receiving device 410 may set the control error value to a positive value if the received power falls below the selected range. The end power transfer signal may include a power transfer termination code indicating the reason for termination. For example, the power transfer termination code may be specified to indicate one of charge complete, internal fault, over temperature, over voltage, over current, battery failure, reconfiguration, no response, or unknown error.

At operation 470, the power transmitting device 400 may adjust the amount of transmission power applied to the power transmission circuit 311 based on the received control message (e.g., control error value). For example, the power transmitting device 400 may terminate power transmission to the power receiving device 410 based on the received control message. In this case, the power transmitting device 400 may perform operation 420 again.

Figure 5:
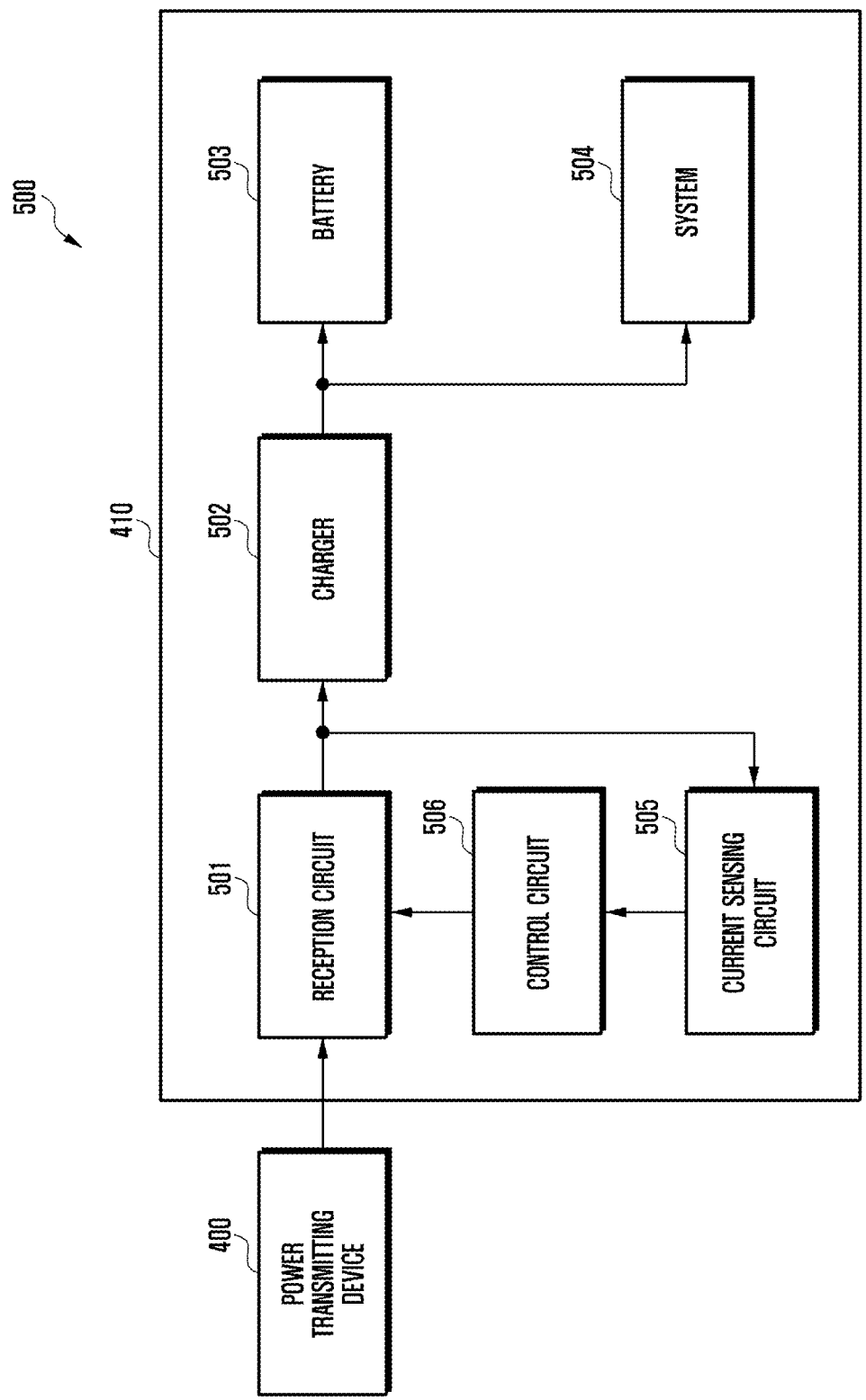
FIG. 5 illustrates a block diagram of a power receiving device according to an embodiment.
Figure 6:
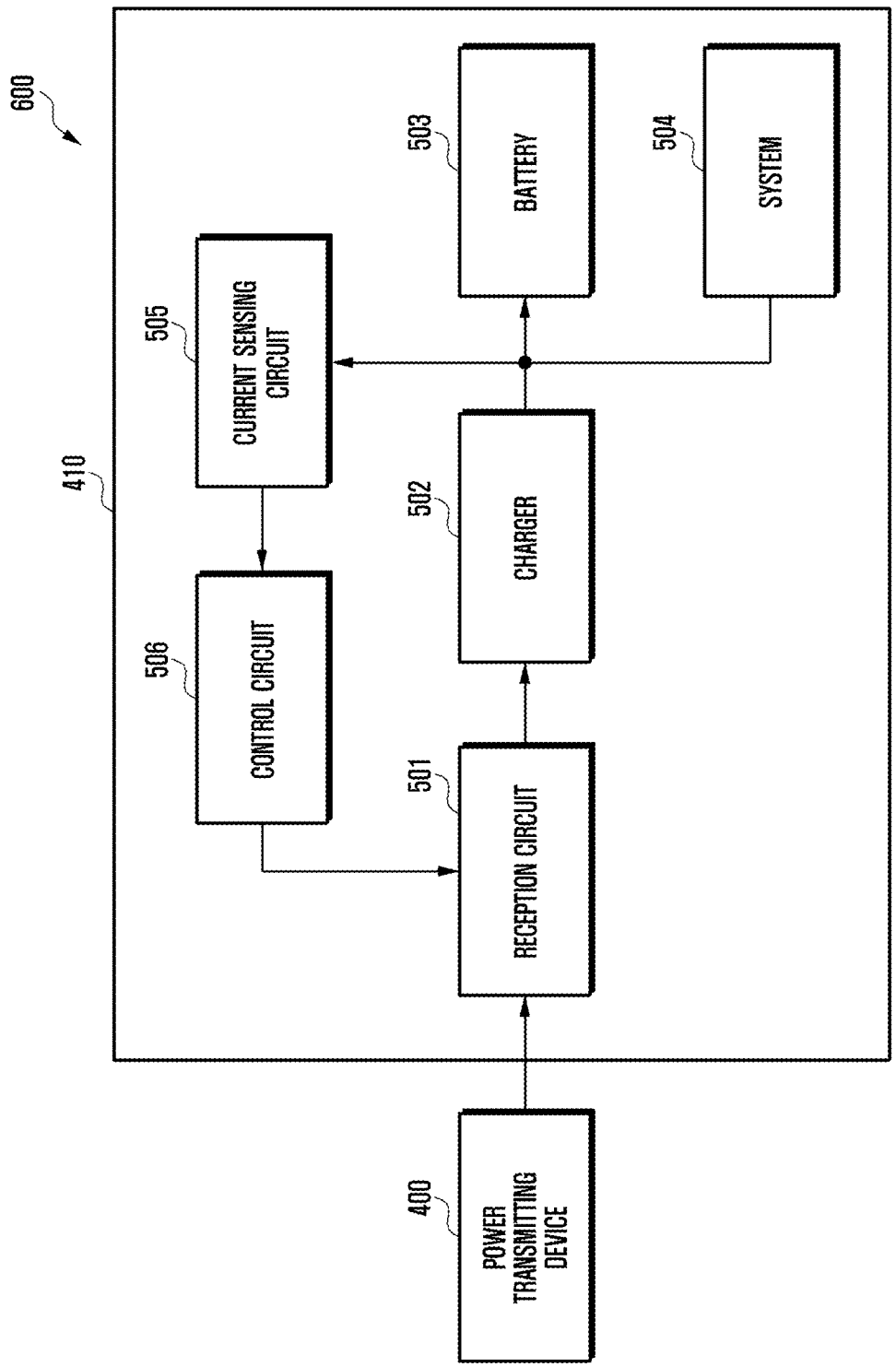
FIG. 6 illustrates a block diagram of a power receiving device according to another embodiment.

FIG. 5 illustrates a block diagram 500 of the power receiving device according to an embodiment. FIG. 6 illustrates a block diagram 600 of the power receiving device according to another embodiment.

With reference to FIG. 5, the power receiving device 410 (e.g., power receiving device 410 in FIG. 4) may include a reception circuit (e.g., reception IC) 501, a charger 502, a battery 503, a system 504, a current sensing circuit 505, or a control circuit 506.

In one embodiment, the reception circuit 501 may wirelessly receive power from the power transmitting device (e.g., power transmitting device 301 in FIG. 3), rectify the received power, and output the rectified power to the charger 502. The reception circuit 501 may include a reception circuit (e.g., resonant circuit) to receive AC power from the transmitting device 400. The reception circuit 501 may support the existing power supply scheme (e.g., WPC scheme or A4WP scheme). The reception circuit 501 may include various types of rectifiers such as a full-bridge diode rectifier. The reception circuit 501 may rectify the received AC power into DC power and output the DC power. For example, the reception circuit 501 may include a converter to convert the voltage of DC power output from the rectifier into a specific voltage. Hence, the reception circuit 501 may receive AC power from the transmitting device 400 and output DC power of a specific voltage through rectification and conversion. The reception circuit 501 may be implemented as a circuit other than an IC type circuit, and the reception circuit 501 may be referred to as a power reception circuit.

In one embodiment, the charger 502 may process the DC power output from the reception circuit 501 in a manner suitable for use in the power receiving device 410. The charger 502 may be implemented with a power management integrated chip (PMIC). To charge the battery 503, the charger 502 may adjust at least one of the voltage or the current of output power in a manner suitable for charging the battery 503. For example, to charge the battery 503 in constant current (CC) mode, the charger 502 may adjust the voltage so that the current of the output power maintains a preset value. Alternatively, to charge the battery 503 in constant voltage (CV) mode, the charger 502 may adjust the current so that the voltage of the output power maintains a preset value. To supply power to the system 504, the charger 502 may adjust at least one of the voltage or the current to a level suitable for the corresponding hardware. For example, when power is supplied to the communication module of the system 504, the charger 502 may adjust the current and voltage of the power to a level suitable for the communication module.

In one embodiment, the input current limit of the charger 502 can be adjusted. The control circuit 506 of the power receiving device 500 can adjust the input current limit of the charger 502, and the maximum magnitude of the current input from the reception circuit 501 to the charger 502 may be adjusted. The charger 502 may receive only a current within the input current limit. Hence, even if the reception circuit 501 outputs a current exceeding the input current limit of the charger 502, the charger 502 may receive or output a current at the input current limit.

In one embodiment, the control circuit 506 may include one or more of a central processing unit (CPU), an application processor (AP), or a communication processor (CP). The control circuit 506 may perform control, communication or data processing operations in relation to one or more other components of, for example, the electronic device 101. The control circuit 506 may also be implemented with a micro control unit (MCU) or a microprocessor.

In various embodiments, the control circuit 506 may be a part of the application processor of the system 504. Alternatively, the control circuit 506 may be a circuit formed separately from the application processor, for example, a circuit embedded in the reception circuit 501.

In one embodiment, the reception circuit 501 may transmit wireless charging related information to the control circuit 506. The charger 502 may also transmit charging related information to the control circuit 506. The control circuit 506 may issue a command to the reception circuit 501 and the charger 502 to set a current or voltage level. For example, the control circuit 506 may issue a command to change the output voltage (Vout) of the reception circuit 501. The control circuit 506 may also send the charger 502 a command to adjust the input current limit or a command to adjust the output current setting.

In one embodiment, the current sensing circuit 505 may detect a sudden current change or a sudden voltage change in the power supply path from the reception circuit 501 through the charger 502 to the system 504 or the battery 503. For example, a sudden current change or a sudden voltage change may correspond to an inrush current due to a change in the state of the system 504. The current sensing circuit 505 may detect an inrush current generated by the system 504 and may transmit a detection signal to the control circuit 506 upon detecting an inrush current. In another embodiment, the current sensing circuit 505 may be replaced with a voltage sensing circuit that senses a sudden voltage change in the power supply path from the reception circuit 501 through the charger 502 to the system 504 or the battery 503. The inrush current may cause the output voltage (Vout) of the reception circuit 501 to be temporarily lowered due to instantaneous current consumption when the operating state of at least some hardware of the system 504 is switched. Such an inrush current may cause instability in the input/output voltage of the charger 502 and may cause interruption of wireless charging (e.g., detached) not intended by the user. For example, the application processor (AP) (not shown) or the communication processor (CP) (not shown) of the system 504 may operate in sleep mode while wireless charging is in progress, and may be switched between normal mode and sleep mode according to a specified period. The processor in sleep mode can operate at lower power than in normal mode. An inrush current may be generated when the application processor or the communication processor of the system 504 transitions from sleep mode to normal mode, and may cause the output voltage (Vout) of the reception circuit 501 to be temporarily lowered and the voltage supplied to the charger 502 to be unstable. If the voltage supplied to the charger 502 becomes unstable, wireless charging may be interrupted (e.g., detached), and the efficiency of wireless charging may be degraded.

In one embodiment, the current sensing circuit 505 may sense the inrush current of the system 504 as described above, and may be disposed, for example, between the reception circuit 501 and the charger 502. The current sensing circuit 505 may include an inductor (e.g., inductor 721 in FIG. 7A) and a comparator (e.g., comparator 722 in FIG. 7A) between the reception circuit 501 and the charger 502 for sensing a peak current of a node. In various embodiments, as shown in FIG. 6, the current sensing circuit 505 may be disposed between the charger 502 and the system and/or between the charger 502 and the battery 503 to sense an inrush current. For example, the current sensing circuit 505 may include an inductor and a comparator for sensing a peak current of the node between the output terminal of the charger 502 and the system 504 and/or between the output terminal of the charger 502 and the battery 503.

In one embodiment, at least a portion of the current sensing circuit 505 may be included in the control circuit 506. For example, the comparator (e.g., comparator 722 in FIG. 7A) of the current sensing circuit 505 may be embedded in the control circuit 506 (e.g., control circuit 713 in FIG. 7A).

In one embodiment, when an inrush current is detected through the current sensing circuit 505 (e.g., upon receiving a detection signal), the control circuit 506 may control the reception circuit 501 to transmit a first control signal (e.g., first control signal 1111 in FIG. 11) for requesting to increase the transmission voltage to the external electronic device (e.g., power transmitting device 400 in FIG. 4). For example, the operation of the reception circuit 501 transmitting the first control signal (e.g., first control signal 1111 in FIG. 11) may be part of the operation of the power receiving device 410 transmitting a control signal to the power transmitting device 400 while receiving power from the power transmitting device 400 at operation 460 in FIG. 4. In one embodiment, the external electronic device (e.g., power transmitting device 400 in FIG. 4) may raise the transmission voltage according to the first control signal (e.g., first control signal 1111 in FIG. 11). This may raise the voltage (Vrec) rectified by the reception circuit 501 and the output voltage (Vout) of the reception circuit 501, stabilizing the voltage supplied to the charger 502 and preventing interruption of wireless charging (e.g., detached state). For example, the operation of the external electronic device (e.g., power transmitting device 400 in FIG. 4) increasing the transmission voltage according to the first control signal (e.g., first control signal 1111 in FIG. 11) may be part of the operation of the power transmitting device 400 adjusting the amount of transmission power applied to the power transmission circuit 311 according to a control message (e.g., control error value) received at operation 470 in FIG. 4.

In one embodiment, while the external electronic device (e.g., power transmitting device 400 in FIG. 4) supplies the transmission voltage of a relatively high voltage level according to the first control signal (e.g., first control signal 1111 in FIG. 11), the control circuit 506 may determine whether an inrush current is sensed through the current sensing circuit 505. If no inrush current is detected, the control circuit 506 may control the reception circuit 501 to transmit a second control signal (e.g., second control signal 1112 in FIG. 11) for requesting to lower the transmission voltage. For example, the operation of the reception circuit 501 transmitting the second control signal (e.g., second control signal 1112 in FIG. 11) may be another part of the operation of the power receiving device 410 transmitting a control signal to the power transmitting device 400 at operation 460 in FIG. 4 while receiving power from the power transmitting device 400. In one embodiment, the external electronic device (e.g., power transmitting device 400 in FIG. 4) may lower the transmission voltage according to the second control signal (e.g., second control signal 1112 in FIG. 11). This may lower the voltage (Vrec) rectified by the reception circuit 501 and the output voltage (Vout) of the reception circuit 501, lowering the voltage supplied to the charger 502. For example, the operation of the external electronic device (e.g., power transmitting device 400 in FIG. 4) lowering the transmission voltage according to the second control signal (e.g., second control signal 1112 in FIG. 11) may be another part of the operation of the power transmitting device 400 adjusting the amount of transmission power applied to the power transmission circuit 311 according to a control message (e.g., control error value) received at operation 470 in FIG. 4.

In various embodiments, the wireless charging system may lower the transmission voltage transmitted by the power transmitting device 400 while no inrush current is detected. This may reduce the heat generated in the power transmitting device 400 and the power receiving device 410, increasing the lifetime and stability of the hardware.

Figure 7A:
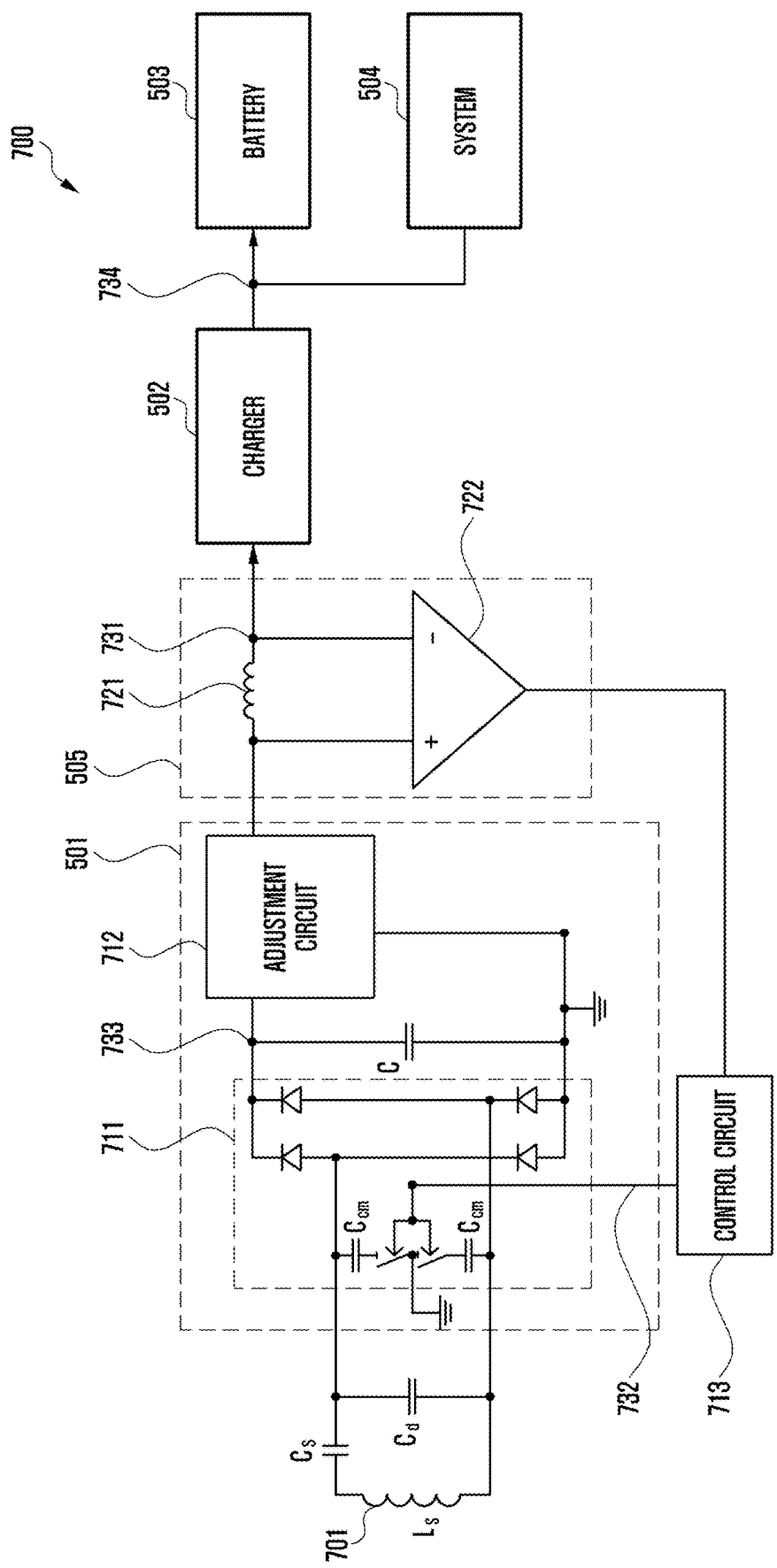
FIGS. 7A and 7B illustrate schematic circuit diagrams of a power receiving device according to various embodiments.
Figure 7B:
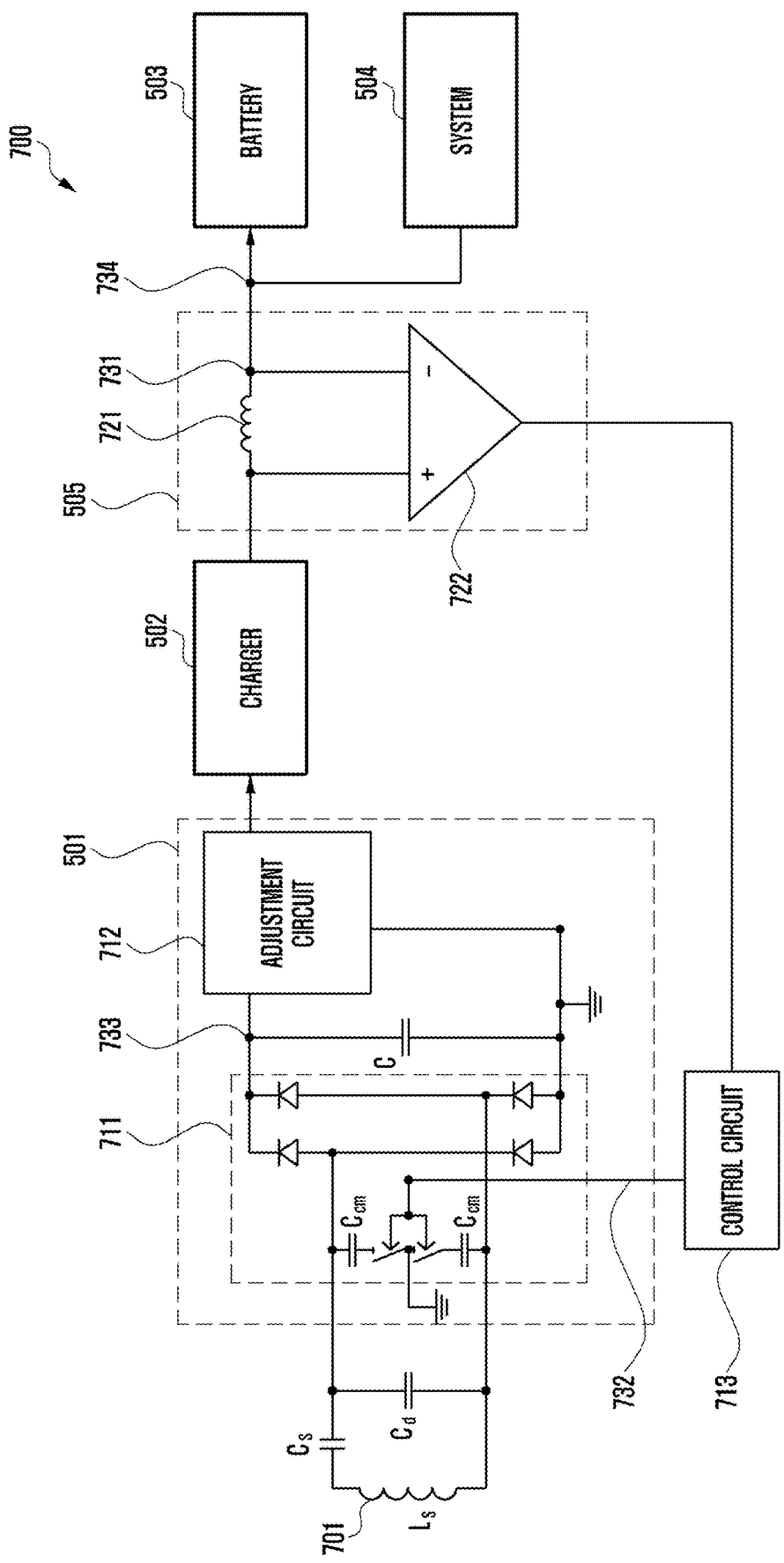

FIGS. 7A and 7B illustrate schematic circuit diagrams of the power receiving device according to various embodiments.

With reference to FIG. 7A, in one embodiment, the power receiving device 700 (e.g., power receiving device 410 in FIG. 4) may include a reception circuit 501, a charger 502, a battery 503, a system 504, a current sensing circuit 505, and a control circuit 713 (e.g., control circuit 506 in FIG. 5). Here, the control circuit 713 may be composed of at least a portion (e.g., rectifier circuit, or adjustment circuit) of the reception circuit 501 and an integrated chip (IC). In a certain embodiment, the control circuit 713 may be a circuit formed separately from the application processor (AP) (not shown) of the system 504.

Figure 11:
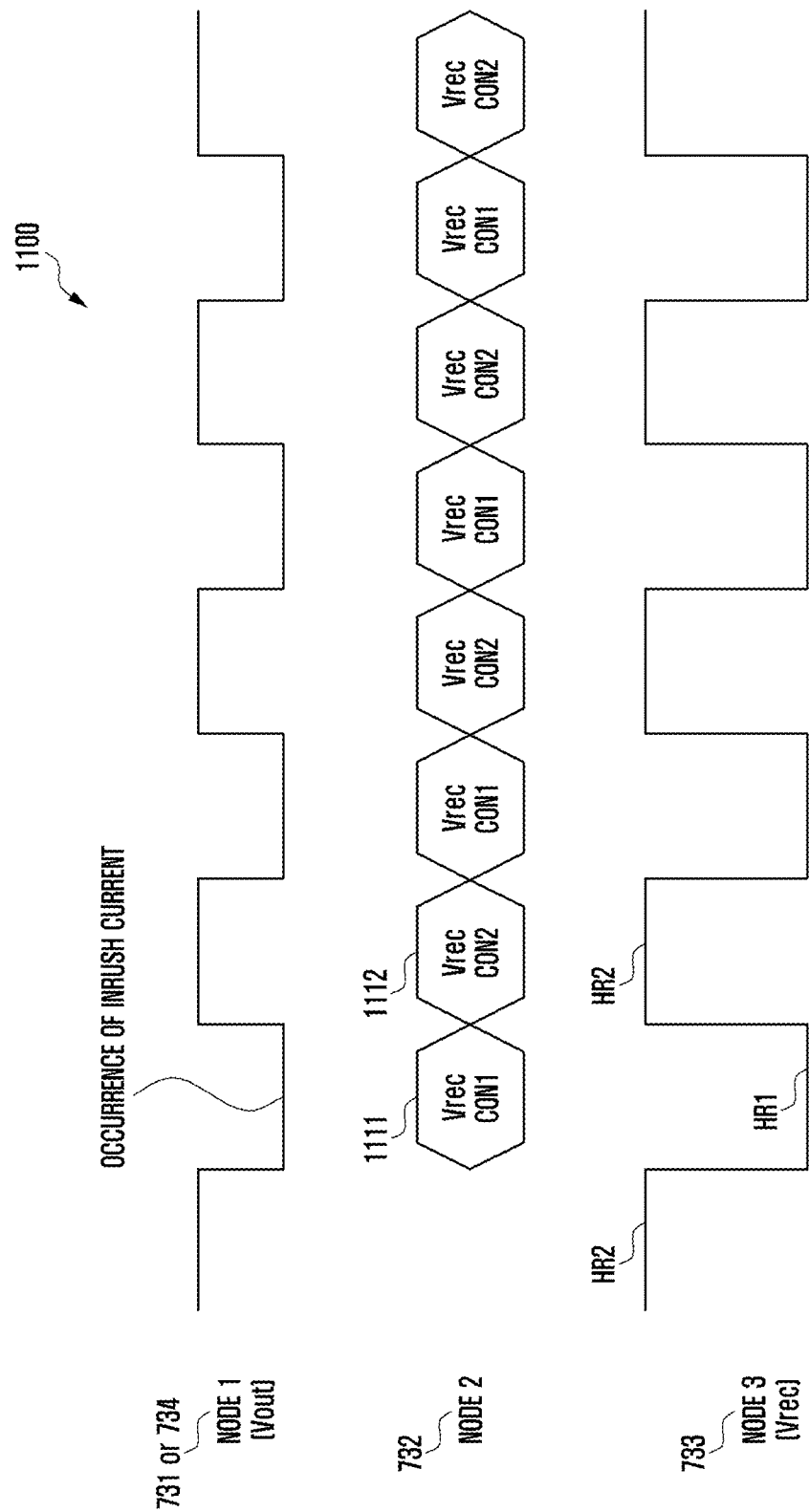
FIG. 11 illustrates a graph depicting dynamic adjustment of the charging current based on detection of an inrush current.

In one embodiment, the reception circuit 501 may include a rectifier circuit 711 (e.g., rectifier circuit 321b in FIG. 3) for rectifying the voltage received through the coil 701, an adjustment circuit 712 (e.g., adjustment circuit 321c in FIG. 3) for adjusting the output voltage of the rectifier circuit 711, and the control circuit 713 that controls the overall operation of the power receiving device 700 and controls the reception circuit 501 to transmit various messages necessary for wireless power transmission (e.g., first control signal 1111 or second control signal 1112 in FIG. 11).

In one embodiment, the current sensing circuit 505 is configured to sense an inrush current of the system 504 and may be disposed, for example, between the adjustment circuit 712 of the reception circuit 501 and the charger 502. For example, the current sensing circuit 505 may include, between the reception circuit 501 and the charger 502, an inductor 721 and a comparator 722 for comparing voltages at both ends of the inductor 721 and outputting the comparison result.

In one embodiment, when the operating mode of at least some hardware of the system 504 such as the application processor (not shown) is switched, an inrush current may occur at the input node (first node 731) of the charger 502 and the voltage at the first node 731 may change rapidly due to the inrush current. If the current changes abruptly at the first node 731 due to the inrush current, a voltage difference occurs between both ends of the inductor 721, and the comparator 722 may compare the voltages at both ends of the inductor 721 and output the comparison result. The sensing signal corresponding to the voltage difference between both ends of the inductor 721 output by the comparator 722 may be transmitted to the control circuit 713.

In another embodiment, as shown in FIG. 7B, the current sensing circuit 505 may be electrically connected to the output node of the charger 502 to sense a current change or a voltage change. For example, the current sensing circuit 505 may include an inductor and a comparator to sense a peak current at the node between the output of the charger 502 and the system 504 and/or between the output of the charger 502 and the battery 503.

In one embodiment, upon receiving a detection signal, the control circuit 713 may control the reception circuit 501 to transmit a first control signal (e.g., first control signal 1111 in FIG. 11) for requesting to increase the transmission voltage to the external electronic device (e.g., power transmitting device 400 in FIG. 4). For example, the operation of the reception circuit 501 transmitting the first control signal (e.g., first control signal 1111 in FIG. 11) may be part of the operation of the power receiving device 410 transmitting a control signal to the power transmitting device 400 while receiving power from the power transmitting device 400 at operation 460 in FIG. 4. In one embodiment, the external electronic device (e.g., power transmitting device 400 in FIG. 4) may raise the transmission voltage according to the first control signal (e.g., first control signal 1111 in FIG. 11). This may raise the voltage (Vrec) rectified by the reception circuit 501 (e.g., at the input node 733 of the adjustment circuit 712) and the output voltage (Vout) of the reception circuit 501, stabilizing the voltage supplied to the charger 502 and preventing interruption of wireless charging (e.g., detached state).

In one embodiment, while the external electronic device (e.g., power transmitting device 400 in FIG. 4) supplies the transmission voltage of a relatively high voltage level according to the first control signal (e.g., first control signal 1111 in FIG. 11), the control circuit 713 may determine whether an inrush current is sensed through the current sensing circuit 505. If no inrush current is detected, the control circuit 713 may control the reception circuit 501 to transmit a second control signal (e.g., second control signal 1112 in FIG. 11) for requesting to lower the transmission voltage.

In the description, the "inrush current" may indicate a sudden current change (or, sudden voltage change) that occurs in the power supply path from the reception circuit 501 through the charger 502 to the system 504 or the battery 503 and is caused by a transition in the operating mode of at least some hardware of the system 504 such as the application processor (AP) (not shown). For example, the inrush current may refer to a sudden increase in current at the input node or the output node of the charger 502 when the application processor (AP) transitions from the sleep state to the wake-up state (or normal state), which may drastically lower the voltage at the input node or the output node of the charger 502. In addition, the inrush current may refer to a sudden decrease in current at the input node or the output node of the charger 502 when the application processor (AP) transitions from the wake-up state (or normal state) to the sleep state, which may drastically raise the voltage at the input node or the output node of the charger 502.

According to various embodiments, the current sensing circuit 505 may be modified in various forms as follows.

Figure 8:
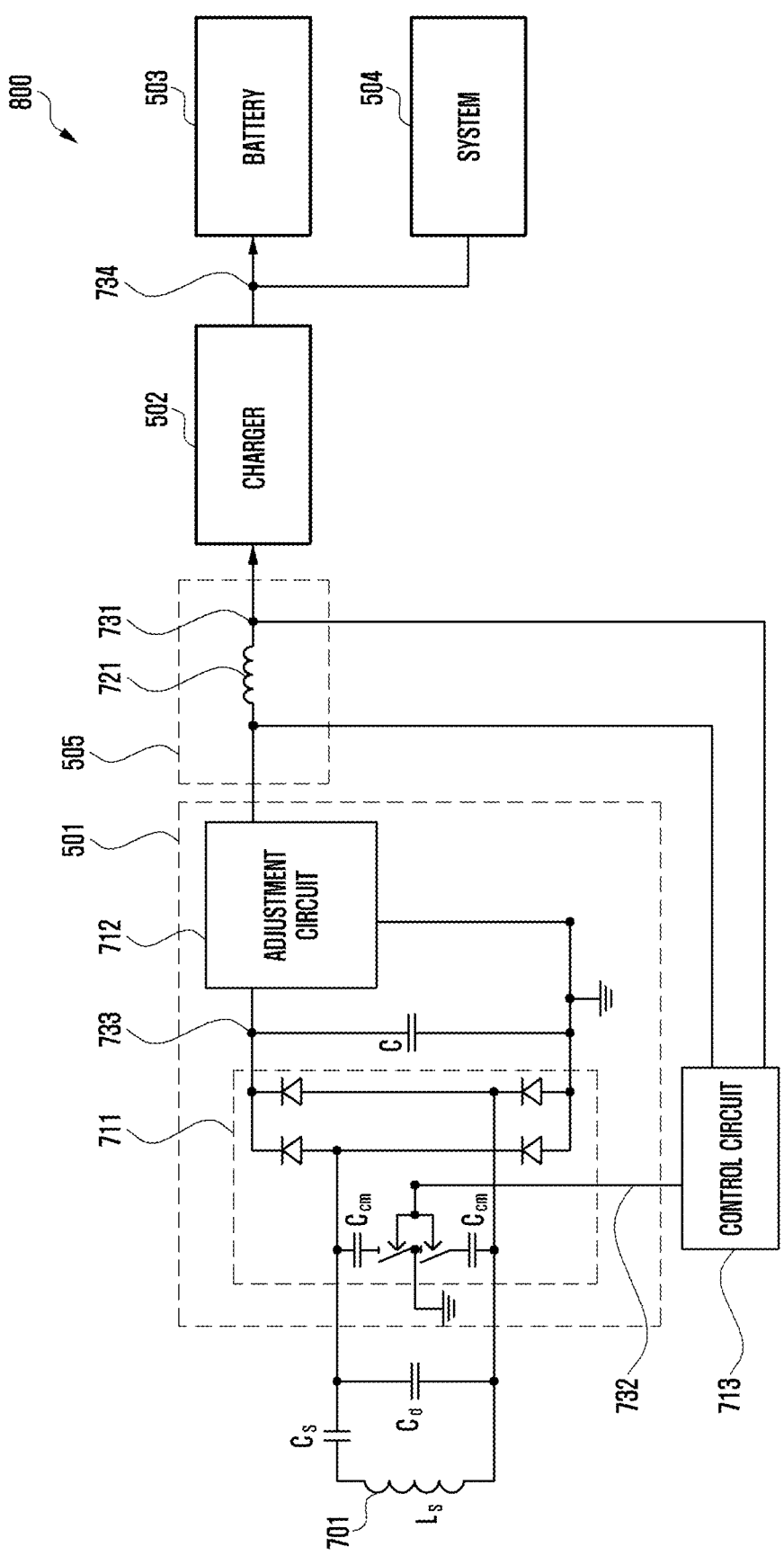
FIG. 8 illustrates a schematic circuit diagram of a power receiving device having a comparator embedded in the control circuit according to another embodiment.
Figure 9:
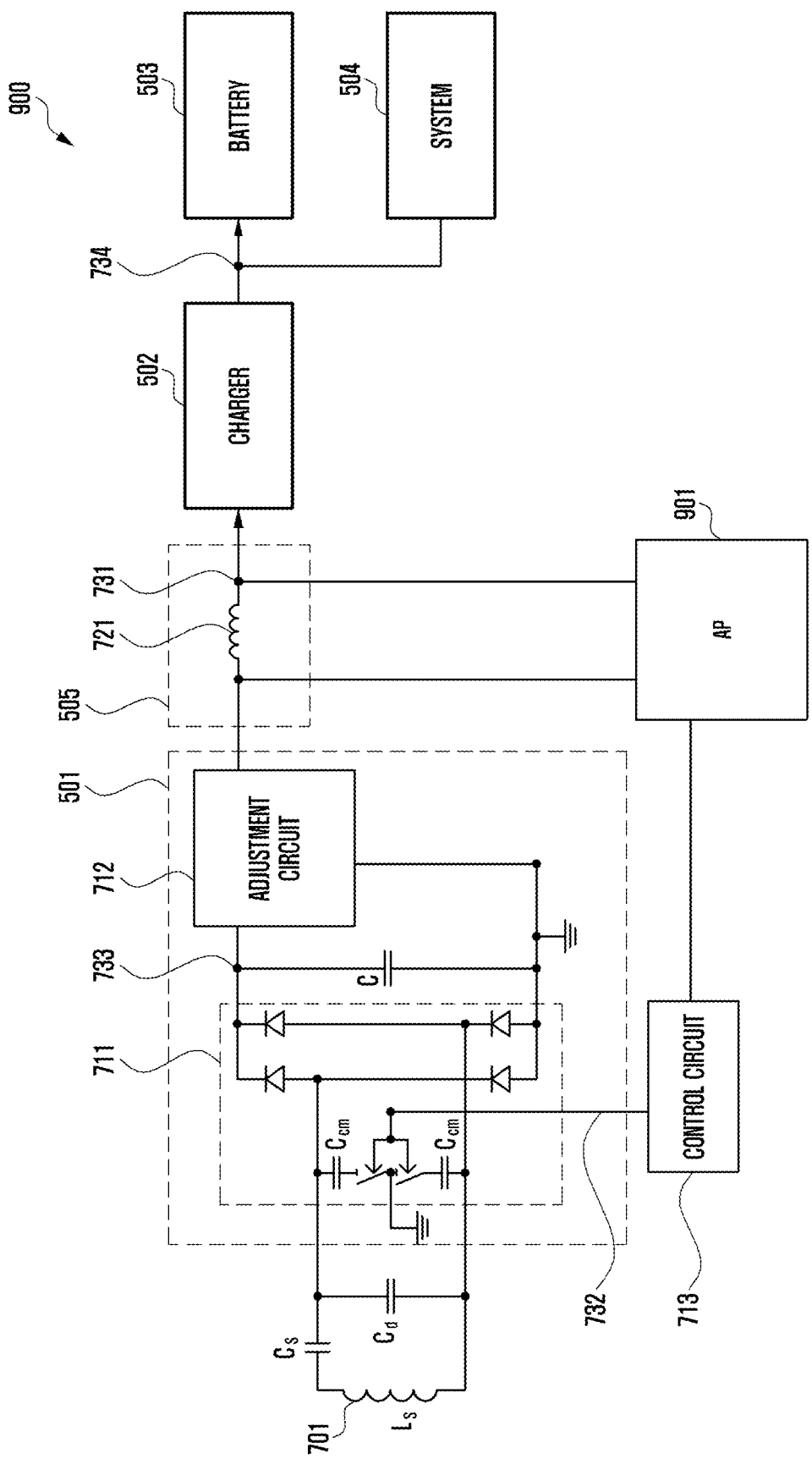
FIG. 9 illustrates a schematic circuit diagram of a power receiving device whose application processor detects an inrush current through an inductor according to another embodiment.
Figure 10:
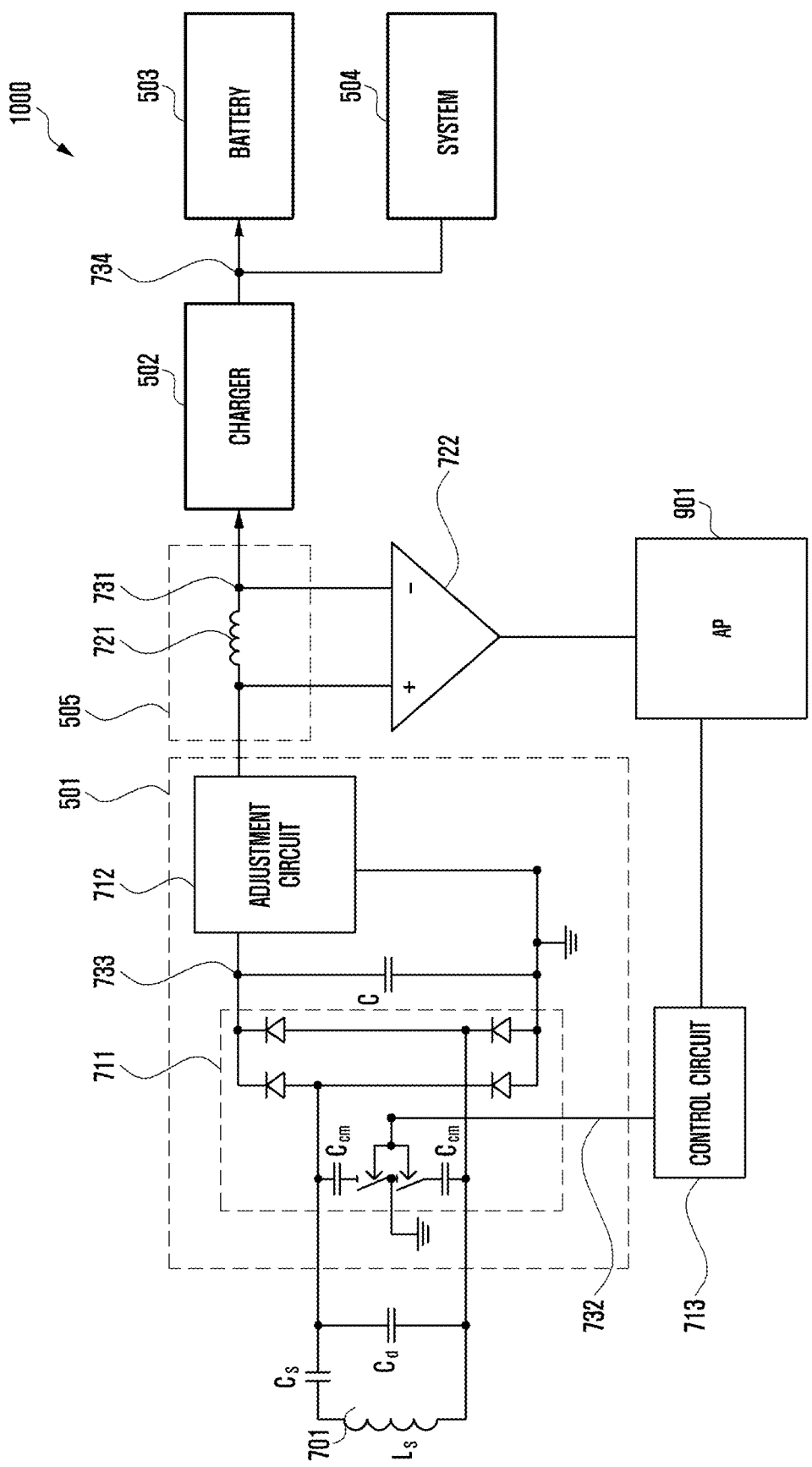
FIG. 10 illustrates a schematic circuit diagram of a power receiving device whose application processor detects an inrush current through an inductor and a comparator according to another embodiment.

FIG. 8 illustrates a schematic circuit diagram 800 of the power receiving device having a comparator embedded in the control circuit according to another embodiment. FIG. 9 illustrates a schematic circuit diagram 900 of the power receiving device whose application processor detects an inrush current through an inductor according to another embodiment. FIG. 10 illustrates a schematic circuit diagram 1000 of the power receiving device whose application processor detects an inrush current through an inductor and a comparator according to another embodiment.

With reference to FIG. 8, in another embodiment, the comparator of the current sensing circuit 505 may be embedded in the control circuit 713. For example, the control circuit 713, which is electrically connected to both ends of the inductor 721 and is embedded with the comparator (e.g., comparator 722 in FIG. 7A), may compare the voltages at both ends of inductor 721 to detect an inrush current.

With reference to FIG. 9, in another embodiment, the current sensing circuit 505 may not include a comparator, and the voltage difference across the inductor 721 may be determined by the application processor (AP) 901. For example, the application processor 901 may be electrically connected to both ends of the inductor 721 in the current sensing circuit 505. The application processor (AP) 901 may measure the voltage difference across the inductor 721 and notify the voltage difference to the control circuit 713.

With reference to FIG. 10, in another embodiment, the application processor (AP) 901 may sense an inrush current by use of the inductor 721 and the comparator 722 in the current sensing circuit 505. For example, the comparator 722 electrically connected to both ends of the inductor 721 may compare voltages at both ends of the inductor 721 and notify the voltage difference to the application processor (AP) 901. The application processor (AP) 901 may determine whether an inrush current is generated based on the voltage difference across the inductor 721. Upon determining that an inrush current has occurred, the application processor (AP) 901 may cause the control circuit 713 to transmit a first control signal (e.g., first control signal 1111 in FIG. 11) for requesting to increase the transmission voltage through the reception circuit 501.

FIG. 11 illustrates a graph 1200 depicting dynamic adjustment of the charging current based on detection of an inrush current. In FIG. 11, "node 1" may indicate the state of the charging voltage of the reception circuit 501 at the input node (e.g., first node 731 in FIG. 7A) of the charger 502. Alternatively, "node 1" may indicate the state of the voltage at the node (e.g., node 734 in FIG. 7A) between the output of the charger 502 and the system 504 and/or between the output of the charger 502 and the battery 503. In FIG. 11, "node 2" may indicate the state of the output terminal used by the control circuit (e.g., control circuit 713 in FIG. 7A) to transmit a control signal through the reception circuit (e.g., reception circuit 501 in FIG. 7A). For example, the control signal may include a first control signal 1111 for requesting an external electronic device (e.g., power transmitting device 400 in FIG. 4) to increase the transmission voltage, and a second control signal 1112 for requesting the external electronic device (e.g., power transmitting device 400 in FIG. 4) to lower the transmission voltage. In FIG. 11, "node 3" may indicate the state of the voltage (Vrec) rectified by the reception circuit 501 (e.g., voltage at the input node 733 of the adjustment circuit 712) according to the transmission voltage from the external electronic device (e.g., power transmitting device 400 in FIG. 4).

With reference to FIG. 11, in the power receiving device (e.g., power receiving device 700 in FIG. 7A), when the operating mode of at least some hardware of the system (e.g., system 504 of FIG. 7A) such as the application processor (AP) (not shown) is switched, an inrush current may occur and the voltage may be drastically lowered at node 1 where the charging voltage of the reception circuit (e.g., reception circuit 501 in FIG. 7A) is supplied to the charger 502.

In one embodiment, the control circuit 713 may detect a sudden voltage decrease at node 1 through the current sensing circuit 505. In response to the detection result, the control circuit 713 may control the reception circuit 501 to transmit a first control signal 1111 for requesting to increase the transmission voltage to the external electronic device (e.g., power transmitting device 400 in FIG. 4). Hence, the power receiving device 700 may transmit the first control signal 1111 in response to a sudden voltage decrease at node 1 due to the inrush current.

In one embodiment, the external electronic device (e.g., power transmitting device 400 in FIG. 4) may increase the transmission voltage based on the first control signal 1111, and the voltage (Vrec) rectified by the reception circuit 501 (e.g., voltage level at node 3) may increase accordingly. For example, the external electronic device (e.g., power transmitting device 400 in FIG. 4) may raise the transmission voltage from a first voltage level to a second voltage level higher than the first voltage level according to the first control signal 1111. In one embodiment, when the transmission voltage increases, the voltage (Vrec) rectified in the reception circuit 501 may increase from a first headroom voltage (HR1) corresponding to the transmission voltage of the first voltage level to a second headroom voltage (HR2) corresponding to the transmission voltage of the second voltage level.

In one embodiment, if no inrush current is detected while the transmission voltage supplied from the external electronic device (e.g., power transmitting device 400 in FIG. 4) is at the second voltage level, the control circuit 506 may transmit a second control signal 1112 for requesting to lower the transmission voltage to the first voltage level to the external electronic device (e.g., power transmitting device 400 in FIG. 4). For example, when the voltage at node 1 rises again after occurrence of the inrush current, the control circuit 506 may control the reception circuit 501 to transmit the second control signal 1112. Hence, the power receiving device 700 may transmit the second control signal 1112 when no inrush current is detected.

In one embodiment, the external electronic device (e.g., power transmitting device 400 in FIG. 4) may lower the transmission voltage based on the second control signal 1112, and the voltage (Vrec) rectified by the reception circuit 501 (e.g., voltage level at node 3) may decrease accordingly. For example, the external electronic device (e.g., power transmitting device 400 in FIG. 4) may lower the transmission voltage from the second voltage level to the first voltage level according to the second control signal 1112. In one embodiment, when the transmission voltage decreases, the voltage (Vrec) rectified in the reception circuit 501 may decrease from the second headroom voltage (HR2) corresponding to the transmission voltage of the second voltage level to the first headroom voltage (HR1) corresponding to the transmission voltage of the first voltage level.

According to various embodiments of the disclosure, the operation method of the electronic device (e.g., electronic device 500 in FIG. 5) may include: supplying a voltage to a charger (e.g., charger 502 in FIG. 5) by a reception circuit (e.g., reception circuit 501 in FIG. 5) based on the power received from an external electronic device (e.g., power transmitting device 400 in FIG. 5) through a coil; supplying a specified voltage to a system (e.g., system 504 in FIG. 5) and controlling the state of charge of a battery (e.g., battery 503 in FIG. 5) by the charger 502 based on the voltage supplied from the reception circuit 501; detecting an inrush current caused by the system 504 via a current sensing circuit 505; and transmitting, upon detecting an inrush current, a first control signal for requesting to increase the transmission voltage supplied from the external electronic device 400. The operation method may further include transmitting, if an inrush current is detected while the transmission voltage supplied from the external electronic device 400 is at a first voltage level, the first control signal for requesting to raise the transmission voltage to a second voltage level higher than the first voltage level. The operation method may further include transmitting, if no inrush current is detected while the transmission voltage supplied from the external electronic device 400 is at the second voltage level, a second control signal for requesting to lower the transmission voltage to the first voltage level to the external electronic device 400. The current sensing circuit 505 may be disposed between the reception circuit 501 and the charger 502 or between the charger 502 and the system 504. The current sensing circuit 505 may include, between the reception circuit 501 and the charger 502, an inductor and a comparator for comparing the voltages at both ends of the inductor and outputting the comparison result. The reception circuit 501 may include a rectifier circuit for rectifying the power received through the coil and an adjustment circuit for adjusting the charging voltage supplied to the charger 502. The system 504 may include an application processor or a communication processor. The operation method may further include transmitting, by the reception circuit 501, the first control signal or the second control signal through the coil. Detecting an inrush current caused by the system 504 via the current sensing circuit 505 may include detecting a current change or a voltage change at least one of the input node or the output node of the charger 502 during a period when the application processor or the communication processor transitions from sleep mode to normal mode. Detecting an inrush current caused by the system 504 via the current sensing circuit 505 may include detecting a current change or a voltage change at least one of the input node or the output node of the charger 502 during a period when the application processor or the communication processor transitions from normal mode to sleep mode.

Figure 12:
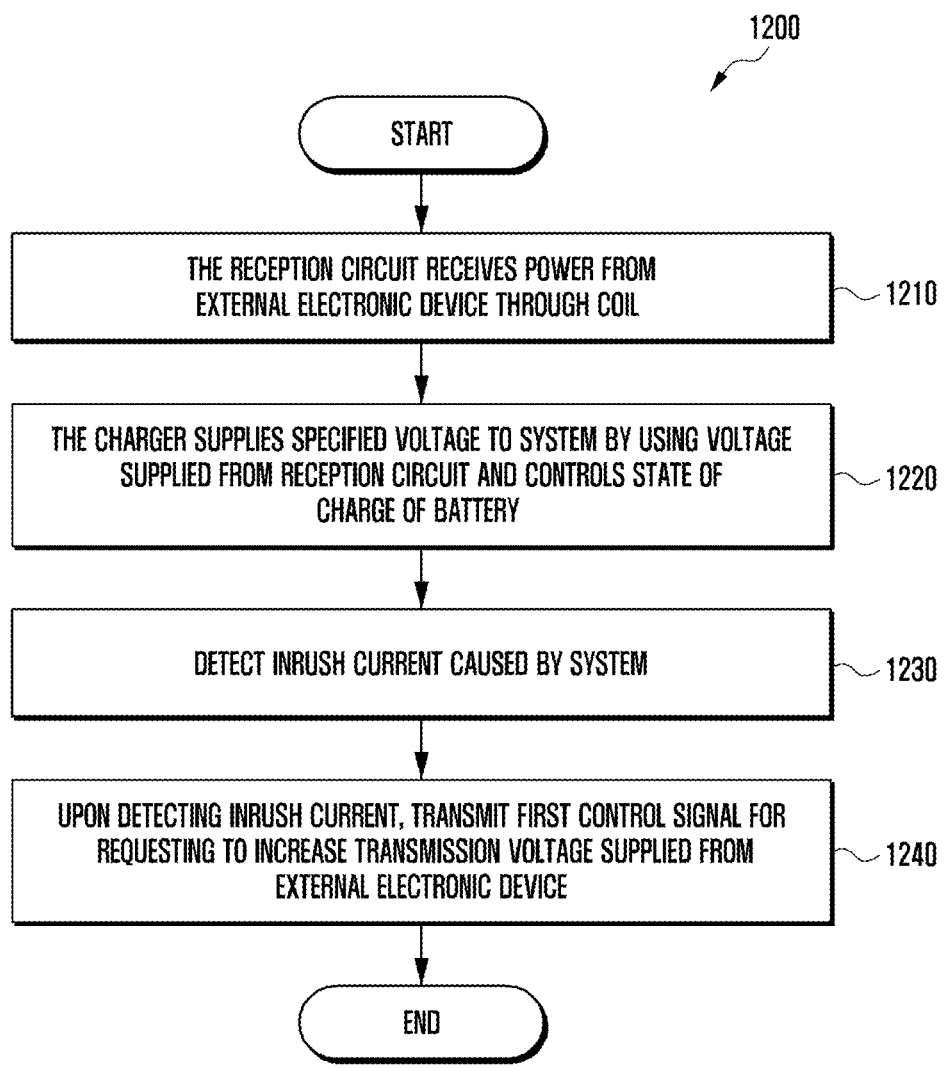
FIG. 12 illustrates a flowchart of operations of the power receiving device according to an embodiment.

FIG. 12 illustrates a flowchart 1200 of operations of the power receiving device according to an embodiment of the disclosure.

With reference to FIG. 12, in one embodiment, at operation 1210, the power receiving device (e.g., power receiving device 700 in FIG. 7A) may utilize the reception circuit (e.g., reception circuit 501 in FIG. 7A) to receive power from an external electronic device (e.g., power transmitting device 301 in FIG. 3) through the coil (e.g., coil 701 in FIG. 7A). For example, the reception circuit 501 may wirelessly receive power from the power transmitting device (e.g., power transmitting device 301 in FIG. 3), rectify the received power, and output the rectified power to the charger (e.g., charger 502 in FIG. 7A).

In one embodiment, at operation 1220, the power receiving device 700 may utilize the charger 502 to supply a specified voltage to the system (e.g., system 504 in FIG. 7A) by using the voltage supplied from the reception circuit 501 and control the state of charge of the battery (e.g., battery 503 in FIG. 7A). For example, the charger 502 may process DC power output from the reception circuit 502 and output the processed DC power suitable for use in the power receiving device 500. For example, the charger 502 may charge the battery 503, and may adjust at least one of the voltage or the current of the output power in a manner suitable for charging the battery 503. For example, to charge the battery 503 in constant current (CC) mode, the charger 502 may adjust the voltage so that the current of the output power maintains a preset value. To charge the battery 503 in constant voltage (CV) mode, the charger 502 may adjust the current so that the voltage of the output power maintains a preset value. To supply power to the system 504, the charger 502 may adjust at least one of the voltage or the current to a level suitable for the corresponding hardware.

In one embodiment, at operation 1230, the power receiving device 700 may detect an inrush current caused by the system 504. For example, when the operating mode of at least some hardware of the system 504 such as the application processor (not shown) is switched, an inrush current may occur and the current of the input node (e.g., first node 731 in FIG. 7A) where the charging voltage of the reception circuit 501 is supplied to the charger 502 may be suddenly lowered. When the current is suddenly lowered at the first node 731 due to the inrush current, a voltage difference occurs across the inductor 721 and the comparator 722 may compare the voltages at both ends of the inductor 721 and output the comparison result. The detection signal corresponding to the voltage difference across the inductor 721 output from the comparator 722 may be transmitted to the control circuit 713.

In one embodiment, at operation 1240, upon detecting an inrush current, the power receiving device 700 may transmit a first control signal (e.g., first control signal 1111 in FIG. 11) for requesting to increase the transmission voltage supplied from the external electronic device (e.g., power transmitting device 301 in FIG. 3). For example, in response to the detection signal, the control circuit 713 may control the reception circuit 501 to transmit the first control signal 1111 for requesting to increase the transmission voltage to the external electronic device (e.g., power transmitting device 301 in FIG. 3). For example, the operation of the reception circuit 501 transmitting the first control signal 1111 may be part of the operation of the power receiving device 410 transmitting a control signal to the power transmitting device 400 while receiving power from the power transmitting device 400 at operation 460 in FIG. 4.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a battery;
   a coil;
   an application processor;
   a communication processor;
   a reception circuit electrically connected to the coil and configured to wirelessly receive power from an external electronic device via the coil;
   a charger configured to control a state of charge of the battery by using a voltage supplied from the reception circuit;
   a current sensing circuit configured to detect an inrush current at least one of an input node or an output node of the charger during a period when the application processor or the communication processor transitions from a sleep mode to a normal mode; and
   at least one control circuit configured to:
      transmit a first control signal to the external electronic device so that the external electronic device increases a transmission voltage of the power supplied from the external electronic device to the electronic device when the inrush current is detected through the current sensing circuit, and
      transmit a second control signal to the external electronic device so that the external electronic device decreases the transmission voltage of the power supplied from the external electronic device to the electronic device when the inrush current is not detected through the current sensing circuit.

2. The electronic device of claim 1, wherein, if the inrush current is detected when the transmission voltage supplied from the external electronic device is at a first voltage level, the control circuit is configured to transmit the first control signal for requesting to increase the transmission voltage to a second voltage level higher than the first voltage level.

3. The electronic device of claim 2, wherein, if the inrush current is not detected when the transmission voltage supplied from the external electronic device is at the second voltage level, the control circuit is configured to transmit the second control signal for requesting to decrease the transmission voltage to the first voltage level to the external electronic device.

4. The electronic device of claim 1, wherein the current sensing circuit is disposed between the reception circuit and the charger or between the charger and the application processor, or between the charger and the communication processor.

5. The electronic device of claim 4, wherein the current sensing circuit comprises:
   an inductor disposed between the reception circuit and the charger; and
   a comparator to compare voltages across the inductor and output a comparison result.

6. The electronic device of claim 1, wherein the reception circuit comprises:
   a rectifier circuit to rectify power received through the coil; and
   an adjustment circuit to adjust the charging voltage supplied to the charger.

7. The electronic device of claim 1, wherein the control circuit is included in the reception circuit or the application processor.

8. A method for operating an electronic device, the method comprising:
- supplying, by a reception circuit, a voltage to a charger based on a power received wirelessly from an external electronic device through a coil;
- controlling, by the charger, a state of charge of a battery;
- detecting, by a current sensing circuit, an inrush current at least one of an input node or an output node of the charger during a period when an application processor or a communication processor transitions from a sleep mode to a normal mode;
- transmitting, upon detecting the inrush current, a first control signal to the external electronic device so that the external electronic device increases a transmission voltage of the power supplied from the external electronic device to the electronic device; and
- transmitting a second control signal to the external electronic device so that the external electronic device decreases the transmission voltage of the power supplied from the external electronic device to the electronic device when the inrush current is not detected through the current sensing circuit.

9. The method of claim 8, further comprising transmitting, in response to detecting the inrush current when the transmission voltage supplied from the external electronic device is at a first voltage level, the first control signal for requesting to increase the transmission voltage to a second voltage level higher than the first voltage level.

10. The method of claim 9, further comprising transmitting, in response to not detecting the inrush current when the transmission voltage supplied from the external electronic device is at the second voltage level, a second control signal for requesting to decrease the transmission voltage to the first voltage level to the external electronic device.

11. The method of claim 10, further comprising transmitting, by the reception circuit, the first control signal or the second control signal through the coil.

12. The method of claim 8, wherein the current sensing circuit is disposed between the reception circuit and the charger or between the charger and the application processor, or between the charger and the communication processor.

13. The method of claim 12, wherein the current sensing circuit comprises:
- an inductor disposed between the reception circuit and the charger; and
- a comparator to compare voltages across the inductor and output a comparison result.

14. The method of claim 8, wherein the reception circuit comprises:
- a rectifier circuit to rectify the power received through the coil; and
- an adjustment circuit to adjust the charging voltage supplied to the charger.

* * * * *